US008259771B1

(12) United States Patent
Shchemelinin et al.

(10) Patent No.: US 8,259,771 B1
(45) Date of Patent: Sep. 4, 2012

(54) INITIATING LASER-SUSTAINED PLASMA

(75) Inventors: Anatoly Shchemelinin, Pleasanton, CA (US); Ilya Bezel, Sunnyvale, CA (US); Matthew W. Derstine, Los Gatos, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 141 days.

(21) Appl. No.: 12/839,332

(22) Filed: Jul. 19, 2010

Related U.S. Application Data

(60) Provisional application No. 61/227,694, filed on Jul. 22, 2009.

(51) Int. Cl.
*H01S 3/223* (2006.01)
*H01S 3/091* (2006.01)

(52) U.S. Cl. ................................ 372/55; 372/76; 372/85

(58) Field of Classification Search .................... 372/55, 372/76, 85, 86, 90
See application file for complete search history.

(56) References Cited

U.S. PATENT DOCUMENTS

| | | | | |
|---|---|---|---|---|
| 6,310,901 | B1 * | 10/2001 | Mahmoudi et al. | 372/38.02 |
| 6,373,873 | B1 * | 4/2002 | Iwasaki et al. | 372/38.02 |
| 2002/0191661 | A1 * | 12/2002 | Morton et al. | 372/55 |
| 2007/0228288 | A1 * | 10/2007 | Smith | 250/426 |
| 2007/0228300 | A1 | 10/2007 | Smith | |

* cited by examiner

*Primary Examiner* — Armando Rodriguez
(74) *Attorney, Agent, or Firm* — Luedeka Neely Group, P.C.

(57) ABSTRACT

A laser-sustained plasma light source with a bulb for enclosing a relatively cool gas environment, and an electrode disposed at least partially within the gas environment. A power supply applies a potential to the electrode, where the power supply is sufficient to create a corona discharge at the electrode within the gas environment, and the power supply is not sufficient to produce an arc discharge within the gas environment. The corona discharge thereby produces a relatively heated gas environment. A pump laser source focuses a laser beam within the gas environment, where the laser beam is sufficient to ignite a plasma in the relatively heated gas environment, but is not sufficient to ignite a plasma in the relatively cool gas environment.

20 Claims, 4 Drawing Sheets

INITIATING LASER-SUSTAINED PLASMA

This patent application claims all rights and priority on prior U.S. provisional patent application Ser. No. 61/227,694 filed 2009, Jul. 22.

FIELD

This invention relates to the field of plasmas. More particularly, this invention relates to initiating a plasma.

INTRODUCTION

Laser-sustained plasma is used as a light source in a variety of different applications, such as in inspection of integrated circuits. Such light sources are constructed by focusing pump laser light into a body of one or more gases and igniting a plasma in the laser focus, such that colder gases within the light source do not absorb the pump laser light that sustains the plasma. The hot gas and the plasma absorb the pump laser, which provides energy to sustain the plasma. Absorption of the laser by hot gas or the plasma is due to higher population of excited energy states in the hot gas and to free electron absorption in the plasma. However, because the cold gases don't absorb the pump laser light very efficiently, some means of igniting the plasma is provided to heat the cold gases so that the pump laser can then sustain the plasma.

FIG. 1 depicts a prior art lamp 100 for the generation of laser-sustained plasma light. A bulb 108 encloses a gas environment 110, from which the plasma will be formed. Exposed within the bulb 108 are the distal ends of a cathode 104 and an anode 106. A pulsed DC high-current power source 102 applies a relatively short pulse of a relatively high voltage (on the order of about thirty kilovolts) between the cathode 104 and the anode 106, thereby creating a short-time high-current arc discharge along a line 112 between the electrodes 104 and 106. This heats the gas 110 along the line 112 directly between the anode 106 and the cathode 104. The heated gases along the line 112 are hot enough to absorb the applied pump laser light (not depicted) with sufficient efficiency so as to sustain the plasma 114 within the bulb 108. The plasma 114 occurs at the intersection of the arc discharge along line 112 and the pump laser light beam.

Unfortunately, the high-current, high-voltage ignition pulse that is required to create the arc discharge can be very damaging to the lamp 100. In addition, there are rigid limitations on the gap, position, material, and shape of the electrodes 104 and 106, so as to withstand the current flow. In addition, high-current pulsed discharge creates strong electro-magnetic pulse that can be damaging to various electronic equipment, and requires special shielding to mitigate the electromagnetic pulse.

What is needed, therefore, is a system that reduces problems such as those described above, at least in part.

SUMMARY OF THE CLAIMS

The above and other needs are met by a laser-sustained plasma light source with a bulb for enclosing a relatively cool gas environment, and an electrode disposed at least partially within the gas environment. A power supply applies a potential to the electrode, where the power supply is sufficient to create a corona or a glow discharge at the electrode within the gas environment, and the power supply is not necessarily sufficient to produce an arc discharge within the gas environment. The corona or the glow discharge thereby produces a relatively heated gas environment or provides enough ion number density. By a relatively heated gas environment we understand the gas environment that has sufficient population of excited energy states for the gas to become absorptive at the pump laser wavelength. This can be achieved either by actual heating of the gas or by creating a non-equilibrium population state, for example by pre-ionizing the gas. A pump laser source focuses a laser beam within the gas environment, where the laser beam is sufficient to ignite a plasma in the relatively heated gas environment, but is not sufficient to ignite a plasma in the relatively cool not ionized gas environment.

In this manner, the gas environment is heated by the corona discharge instead of by an arc discharge. While the heating is sufficient for the plasma to be sustained by the pump laser, the corona discharge does not damage the structure—such as the electrode—like an arc discharge would. Because of this, the electrode can be configured as a finer element, such as with a sharp point, which aids in the formation of the corona discharge or a glow discharge and lowers the voltage required for ignition. Absence of high-current breakdown discharge eliminates the electro-magnetic pulse during ignition.

In various embodiments, the electrode is pointed on an end that is disposed within the gas environment. In some embodiments the electrode is formed of an electrically conductive material that does not include tungsten. In some embodiments the power supply is an alternating current power supply. In some embodiments the light source has only a single electrode. In some embodiments a second electrode is connected to the power supply. In some embodiments a second electrode is connected to the power supply, where the second electrode is disposed at least partially within the bulb. In other embodiments a second electrode is connected to the power supply, where the second electrode is disposed completely outside of the bulb. In some embodiments the power supply provides less than one ampere. In some embodiments a heater heats the electrode.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 2:
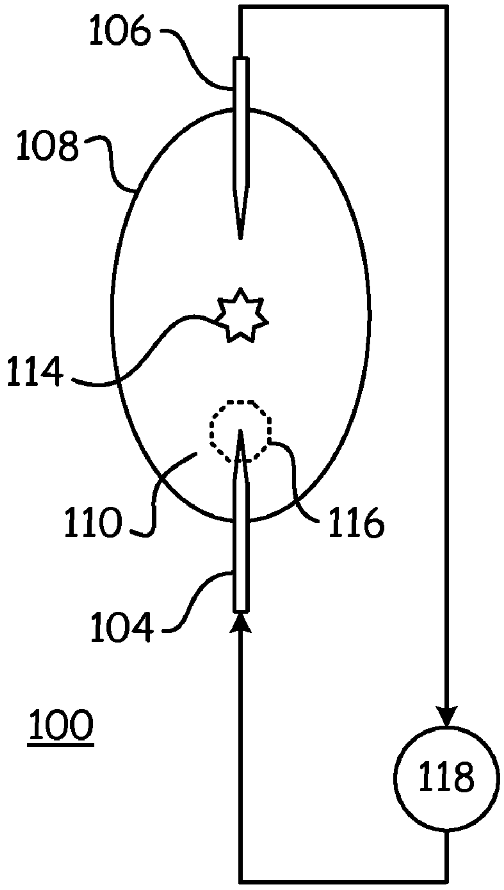
FIG. 2 is a functional block diagram of a plasma light source according to a first embodiment of the present invention.

According to various embodiments of the present invention, the high-power, high-voltage DC pulse generator 102 is replaced with a low-power, high-voltage DC or AC power supply 118 (as depicted in FIG. 2) that is not capable of producing a high-current arc discharge within the bulb 108. In addition, the cathode 104 tip shape and material is optimized for generating a low-current corona or glow discharge 116 around the tip of the cathode 104.

This corona discharge 116 produces charged particles that are more easily ionized. The shape and material of the cathode 104 causes electrons to be extracted from the cathode 104 and accelerated to a gas impact ionization level using a relatively low voltage. The process is local to the cathode 104, and therefore not very sensitive to the location and geometry of the anode 106.

According to various embodiments of the present invention, a current-limited voltage is applied to the cathode 104 to generate the corona discharge 116. Depending upon the specific conditions within the bulb 108, a glow discharge might occur. The generated charges drift toward the anode 106. Thus, the entire bulb 108 fills with a low density cold plasma. Absorption of the pump laser light by the cold plasma is sufficient to initiate an optical breakdown of the source species at the focal point of the pump laser light.

Changing the voltage and current applied at the cathode 104 causes changes in the cold plasma density, and can be tailored to obtain a desired absorption level of the pump laser light. The current level applied by the power supply 118 is on the order of milliamperes, as opposed to the hundreds of amperes of in-rush current and even higher arc current of a standard arc discharge ignition pulse. The use of a relatively low current power supply 118 allows the use of a sharply pointed cathode 104 that decreases the corona discharge voltage. Such a sharp point on a cathode 104 that is used for an arc discharge ignition would be quickly burned off and rendered inoperable.

Because all of the charge is generated by the cathode 104 in the corona 116, the entire gas volume 110 in the bulb 108 is charged to the cathode 104 potential, and the gap between the cathode 104 and the anode 106 can be increased to any desired size. This allows the cathode 104 to be moved father away from the laser sustained plasma location 114, which in turn reduces the thermal stress on the cathode 104 during operation of the laser sustained plasma 114. It also enables further optimization of the cathode 104 by using materials other than tungsten in the fabrication of the cathode 104.

Figure 1:
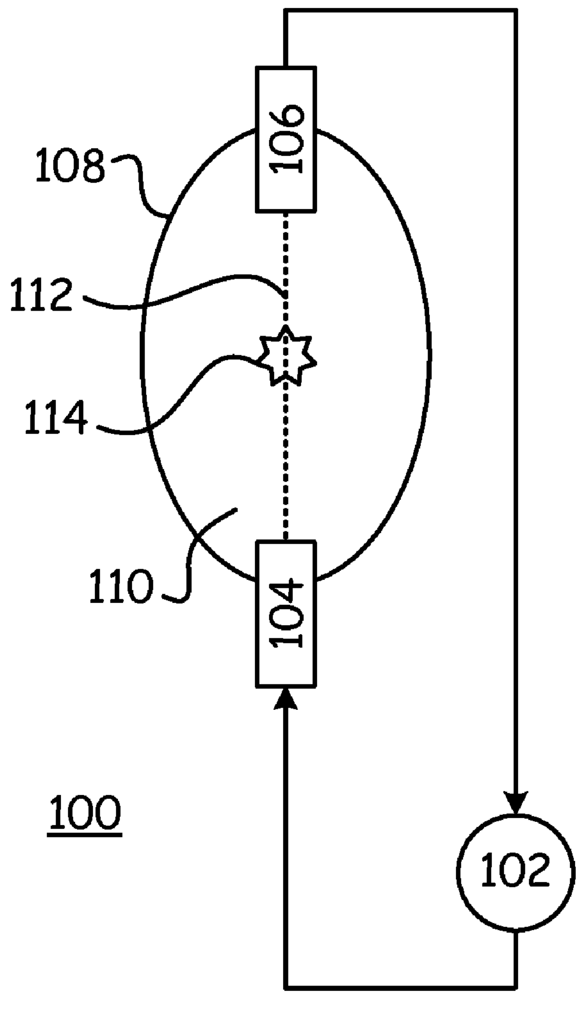
Fig. 1 (Prior Art)
FIG. 1 is a functional block diagram of a prior art plasma light source.
Figure 3:
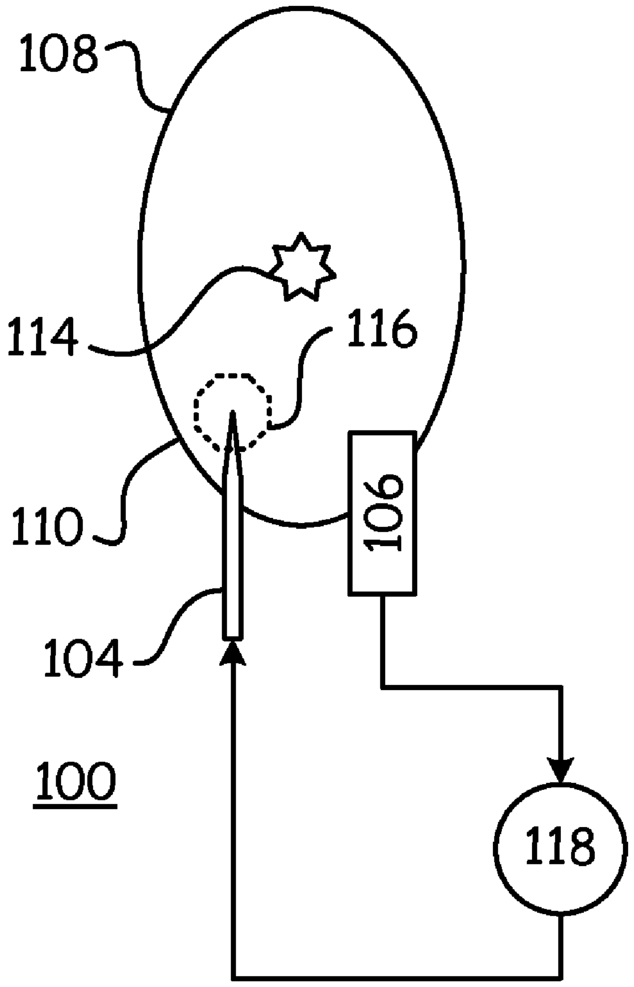
FIG. 3 is a functional block diagram of a plasma light source according to a second embodiment of the present invention.
Figure 4:
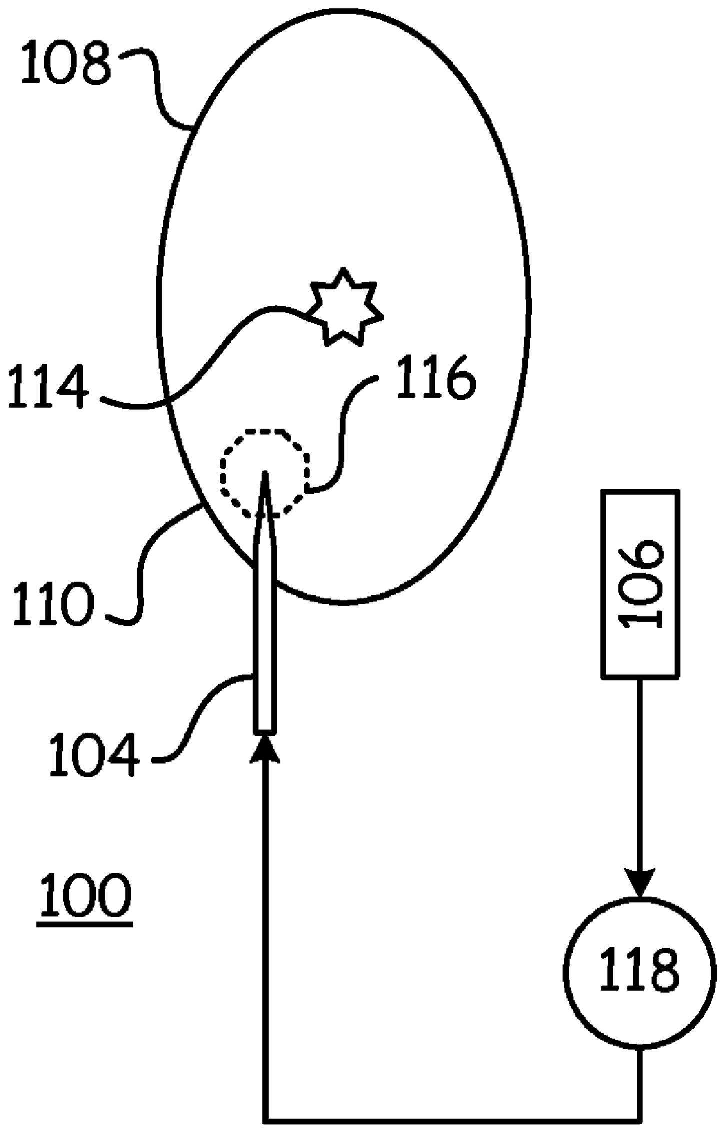
FIG. 4 is a functional block diagram of a plasma light source according to a third embodiment of the present invention.

Another benefit is the freedom to move the anode 106 far away from the laser sustained plasma 114, such as to side of the bulb 108 as depicted in FIG. 3, or even outside of the bulb 108 as depicted in FIG. 4. In this latter case, the use of an AC power supply 118 might be required. In addition, an AC discharge can be accomplished with only a single electrode 104. Thus, the laser sustained plasma 114 can be ignited outside of the anode 106—cathode 104 axis 112 (as depicted in FIG. 1).

Because the ignition process does not rely upon large discharge currents, smaller electrodes of different materials can be used, because they do not need to withstand the extreme temperatures and conditions of a high current ignition process. In addition, they do not need to be as close to the focal point of the pump laser beam, where the plasma 114 is maintained, which removes them from the high heat conditions immediately surrounding the plasma 114. Smaller electrodes results in smaller feed-throughs in the bulb 108, which reduces the thermal stress on the bulb 108, and increases the life of the lamp 100. Further, the design of the cathode 104 can be optimized thermal and thermodynamic processes rather than for high current discharges.

In some embodiments the cathode 104 is heated to increase the electron emission. Heating can be accomplished electrically (such as is done in vacuum tubes) or optically (with a laser beam).

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A laser-sustained plasma light source, comprising:
a bulb for enclosing a relatively cool gas environment,
an electrode disposed at least partially within the gas environment,
a power supply for applying a potential to the electrode, where the power supply is sufficient to create a corona discharge at the electrode within the gas environment, and the power supply is not sufficient to produce a high-current arc discharge within the gas environment, the corona discharge thereby changing all of the relatively cool gas environment into a relatively heated gas environment that is charged to the potential of the electrode, and
a pump laser source for focusing a laser beam within the gas environment, where the laser beam is sufficient to ignite a plasma in the relatively heated gas environment, but is not sufficient to ignite a plasma in the relatively cool gas environment.

2. The laser-sustained plasma light source of claim 1, wherein the electrode is pointed on an end disposed within the gas environment.

3. The laser-sustained plasma light source of claim 1, wherein the electrode is formed of an electrically conductive material that does not include tungsten.

4. The laser-sustained plasma light source of claim 1, wherein the power supply is an alternating current power supply.

5. The laser-sustained plasma light source of claim 1, wherein the light source has only a single electrode.

6. The laser-sustained plasma light source of claim 1, further comprising a second electrode connected to the power supply.

7. The laser-sustained plasma light source of claim 1, further comprising a second electrode connected to the power supply, where the second electrode is disposed at least partially within the bulb.

8. The laser-sustained plasma light source of claim 1, further comprising a second electrode connected to the power supply, where the second electrode is disposed completely outside of the bulb.

9. The laser-sustained plasma light source of claim 1, wherein the power supply provides less than one ampere.

10. The laser-sustained plasma light source of claim 1, further comprising a heater for heating the electrode.

11. A method for generating light, the method comprising the steps of:
enclosing a relatively cool gas environment within a bulb,
disposing an electrode at least partially within the gas environment,
applying a potential to the electrode with the electrode, where the power supply is sufficient to create a corona discharge at the electrode within the gas environment, and the power supply is not sufficient to produce an high-current arc discharge within the gas environment, the corona discharge thereby changing all of the relatively cool gas environment into a relatively heated gas environment that is charged to the potential of the electrode, and focusing a laser beam within the gas environment, where the laser beam is sufficient to ignite a plasma in the relatively heated gas environment, but is not sufficient to ignite a plasma in the relatively cool gas environment.

12. The method of claim 11, wherein the electrode is pointed on an end disposed within the gas environment.

13. The method of claim 11, wherein the electrode is formed of an electrically conductive material that does not include tungsten.

14. The method of claim 11, wherein the power supply is an alternating current power supply.

15. The method of claim 11, wherein only a single electrode is used.

16. The method of claim 11, wherein the potential is relative to a second electrode connected to the power supply.

17. The method of claim 11, wherein the potential is relative to a second electrode connected to the power supply, where the second electrode is disposed at least partially within the bulb.

18. The method of claim 11, wherein the potential is relative to a second electrode connected to the power supply, where the second electrode is disposed completely outside of the bulb.

19. The method of claim 11, wherein the power supply provides less than one ampere.

20. The method of claim 11, further comprising heating the electrode.

* * * * *